(No Model.)
W. C. RARIG.
JOINT AND BEARING.
No. 523,238. Patented July 17, 1894.
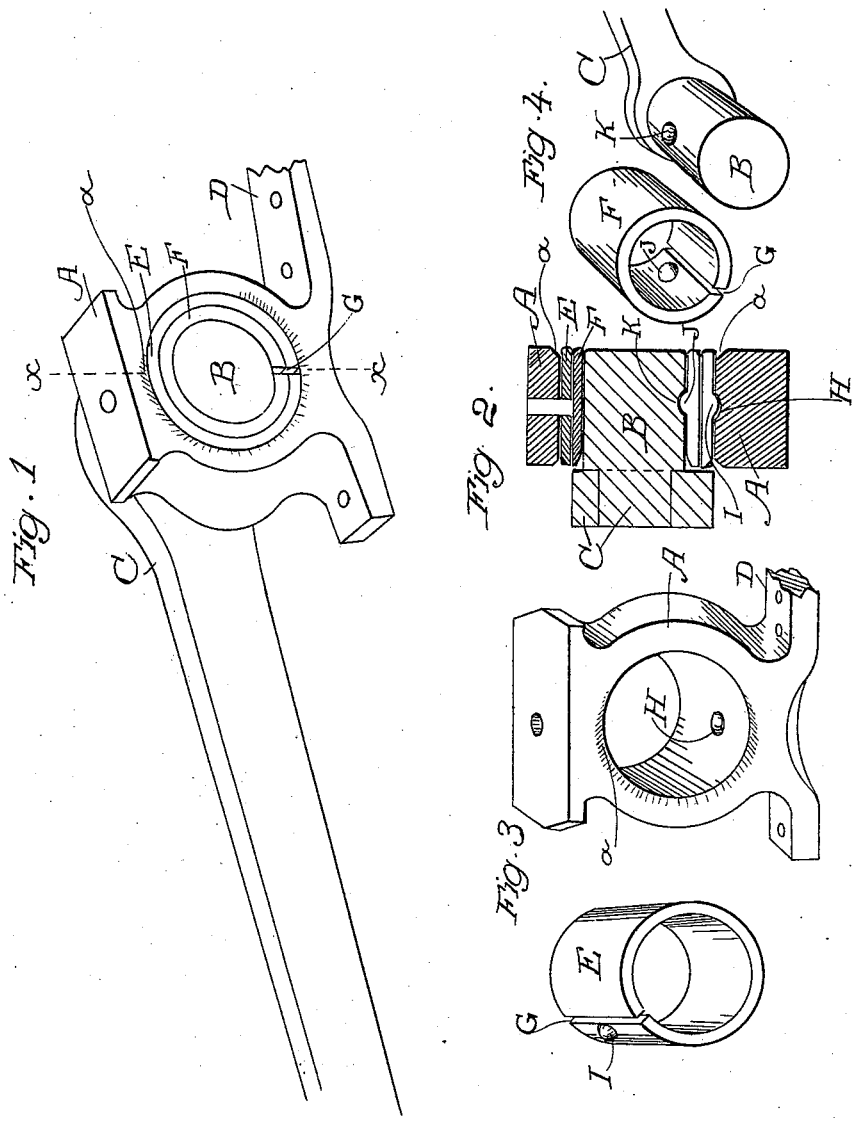

UNITED STATES PATENT OFFICE.

WELDON C. RARIG, OF SAN FRANCISCO, CALIFORNIA.

JOINT AND BEARING.

SPECIFICATION forming part of Letters Patent No. 523,238, dated July 17, 1894.

Application filed April 11, 1894. Serial No. 507,176. (No model.)

*To all whom it may concern:*

Be it known that I, WELDON C. RARIG, a citizen of the United States, residing in the city and county of San Francisco, State of California, have invented an Improvement in Joints and Bearings; and I hereby declare the following to be a full, clear, and exact description of the same.

My invention relates to an improved joint and bearing.

It consists in certain details of construction, which will be more fully explained by reference to the accompanying drawings, in which—

Figure 1 is a perspective view of my invention, showing a joint. Fig. 2 is a vertical transverse section on the dotted line $x$—$x$ of Fig. 1, showing the means for securing the movable sleeves. Figs. 3 and 4 are views showing the parts separate.

The object of this invention is to provide an improved means for securing the removable bushings which are employed in the joint, to prevent their being loosened by the rapid motion of the parts, and to provide an elastic expanding and contracting lock to retain the bushings securely in place.

A is the exterior box or casing, and B is the pin by which connection is made between the pitman C and the part D which is to be moved thereby. The opening in the exterior casing is enough larger than the diameter of the pin to admit of two sleeves or bushings E and F, the larger one being secured within the hole in the casing and the smaller one secured to the pin which it surrounds, and the interior of one and the exterior of the other, form the movable joint surface. These bushings are made of rolled spring steel suitably hardened, and have an open slot or space G made in one side extending from end to end.

Within the outer casing, and preferably at the lower part, is made a hole or indentation H. The outer bushing has formed upon it a small projection I, by means of a punch, this projection being adapted to fit into the opening or depression H in the casing. The periphery of the opening in the casing is made with a beveled edge $a$, and when the ring or bushing E has been bent into its proper shape, it is slightly larger than the opening in the casing. By placing the end of the ring against this beveled side of the opening, and forcing it in by the pressure of a vise or other suitable power, it will be slightly compressed in diameter by reason of the slotted opening on the side, and when the projecting point I arrives opposite the depression in the casing it drops into it. The bushing now fits snugly within the casing and is held both by frictional contact caused by its expansion within the casing, and also by the projecting point and depression previously described. The bushing or sleeve F which fits upon the exterior surface of the pin is in like manner made with a projection J which is adapted to fit into a corresponding depression K in the side of the pin. The end of this bushing is also slightly beveled so that it can be forced upon the pin in the same manner that the exterior bushing is forced into the casing A, and it will be locked by the projection and indentation in the same manner. When the two are in place they fit so as to make a good practical working joint. The channels between their meeting edges are preferably made at the bottom, and this permits sand and grit to work out of the eye, which insures additional life to the working parts.

All wear takes place between the bushings, and the pin and casing are preserved indefinitely.

Single sleeves or bushings are secured in the same manner, where but one is necessary.

Having thus described my invention, what I claim as new, and desire to secure by Letters Patent, is—

1. Elastic open sided sleeves or bushings placed one within the other and adapted to fit between the parts of a joint, one of said sleeves having means for engaging one of the members of the joint and the other sleeve having means for engaging the other member of the joint, and the meeting faces of the sleeves movable upon each other.

2. A joint or bearing consisting of the pin or shaft, an exterior box, an elastic open sided sleeve fitting the pin, and a second elastic open-sided sleeve fitting the interior of the box and said sleeve having their adjacent faces forming a movable joint upon each other, there being indentations made on the surfaces of the box and pin, respectively, and corresponding projections upon the surfaces of the sleeves or bushings adapted to enter the indentations and lock the parts together.

In witness whereof I have hereunto set my hand.

WELDON C. RARIG.

Witnesses:
S. H. NOURSE,
H. F. ASCHECK.